United States Patent
El-Khamy et al.

(10) Patent No.: US 11,699,070 B2
(45) Date of Patent: Jul. 11, 2023

(54) METHOD AND APPARATUS FOR PROVIDING ROTATIONAL INVARIANT NEURAL NETWORKS

(71) Applicant: Samsung Electronics Co., Ltd., Gyeonggi-do (KR)

(72) Inventors: Mostafa El-Khamy, San Diego, CA (US); Jungwon Lee, San Diego, CA (US); Yoo Jin Choi, San Diego, CA (US); Haoyu Ren, San Diego, CA (US)

(73) Assignee: Samsung Electronics Co., Ltd

( * ) Notice: Subject to any disclaimer, the term of this patent is extended or adjusted under 35 U.S.C. 154(b) by 1008 days.

(21) Appl. No.: 16/452,005

(22) Filed: Jun. 25, 2019

(65) Prior Publication Data

US 2020/0285894 A1    Sep. 10, 2020

Related U.S. Application Data

(60) Provisional application No. 62/814,099, filed on Mar. 5, 2019.

(51) Int. Cl.
| | |
|---|---|
| *G06N 3/08* | (2023.01) |
| *G06N 20/10* | (2019.01) |
| *G06F 18/214* | (2023.01) |
| *G06V 10/82* | (2022.01) |
| *G06V 10/44* | (2022.01) |
| *G06V 10/46* | (2022.01) |

(52) U.S. Cl.
CPC ............. *G06N 3/08* (2013.01); *G06F 18/214* (2023.01); *G06N 20/10* (2019.01); *G06V 10/454* (2022.01); *G06V 10/462* (2022.01); *G06V 10/82* (2022.01)

(58) Field of Classification Search
CPC ........ G06K 9/6256; G06N 20/00; G06N 3/08; G06V 10/443; G06V 10/473
USPC ...................................................... 706/15–45
See application file for complete search history.

(56) References Cited

U.S. PATENT DOCUMENTS

| | | | | |
|---|---|---|---|---|
| 5,711,293 | A * | 1/1998 | Brain | A61M 16/04 128/207.14 |
| 5,879,844 | A * | 3/1999 | Yamamoto | G03F 7/70441 430/30 |
| 7,747,070 | B2 * | 6/2010 | Puri | G06N 3/06 706/15 |
| 8,139,900 | B2 * | 3/2012 | Gokturk | G06V 20/20 382/282 |

(Continued)

FOREIGN PATENT DOCUMENTS

| | | |
|---|---|---|
| WO | WO 2018077707 | 5/2018 |
| WO | WO 2018096288 | 5/2018 |

OTHER PUBLICATIONS

Huang et al, "Kernel Methods Match Deep Neural Networks on TIMIT", IEEE, pp. 205-209 (Year: 2014).*

(Continued)

*Primary Examiner* — Anil Khatri
(74) *Attorney, Agent, or Firm* — The Farrell Law Firm, P.C.

(57) ABSTRACT

A method and apparatus for providing a rotational invariant neural network is herein disclosed. According to one embodiment, a method includes receiving a first input of an image in a first orientation and training a kernel to be symmetric such that an output corresponding to the first input is the same as an output corresponding to a second input of the image in a second orientation.

18 Claims, 6 Drawing Sheets

(56) References Cited

U.S. PATENT DOCUMENTS

| | | | | |
|---|---|---|---|---|
| 8,363,956 | B1* | 1/2013 | Silver | G06V 10/752 382/209 |
| 8,594,410 | B2* | 11/2013 | Schmidt | G06T 7/0014 382/128 |
| 8,885,887 | B1 | 11/2014 | Chen et al. | |
| 9,646,243 | B1* | 5/2017 | Gokmen | G06N 3/04 |
| 9,799,098 | B2* | 10/2017 | Seung | G06V 10/454 |
| 10,083,499 | B1* | 9/2018 | Milanfar | G06T 5/001 |
| 10,185,892 | B1* | 1/2019 | Mishra | G06V 30/1916 |
| 10,296,829 | B2* | 5/2019 | Mostafa | G06N 3/0454 |
| 10,387,774 | B1* | 8/2019 | Cao | G06N 3/08 |
| 10,599,978 | B2* | 3/2020 | Sekiyama | G06V 10/454 |
| 10,679,040 | B2* | 6/2020 | Chen | G06V 40/172 |
| 10,873,456 | B1* | 12/2020 | Dods | H04L 9/50 |
| 11,081,219 | B1* | 8/2021 | Dods | G06N 20/00 |
| 11,151,405 | B1* | 10/2021 | Hoffmann | G06F 18/23 |
| 11,232,360 | B1* | 1/2022 | Nama | G06N 3/063 |
| 11,288,544 | B2* | 3/2022 | Leung | G06V 20/52 |
| 11,562,179 | B2* | 1/2023 | Ho | G06F 18/2113 |
| 2010/0142775 | A1 | 6/2010 | Ganeshan et al. | |
| 2012/0154641 | A1 | 6/2012 | Wong et al. | |
| 2017/0344900 | A1 | 11/2017 | Alzahrani | |
| 2017/0371348 | A1 | 12/2017 | Mou | |
| 2018/0109900 | A1 | 4/2018 | Lyren et al. | |
| 2019/0026954 | A1 | 1/2019 | Vats | |

OTHER PUBLICATIONS

Hertz et al, "Learning a Kernel Function for Classification with Small Training Samples", ACM, pp. 401-408 (Year: 2006).*

Cai et al, "Long Live TIME: Improving Lifetime for Training-In-Memory Engines by Structured Gradient Sparsification", ACM, pp. 1-6 (Year: 2018).*

Kim et al, "Face Recognition Using Kernel Principal Component Analysis", IEEE, pp. 40-42 (Year: 2002).*

Ince et al, "Kernel Principal Component Analysis and Support Vector Machines for Stock Price Prediction", IEEE, pp. 2053-2058 (Year: 2004).*

Zhu et al, "Orientation Robust Object Detection in Aerial Images Using Deep Convolutional Neural Network", IEEE, pp. 3735-3739 (Year: 2015).*

Lawrence et al, "Face Recognition: A Convolutional Neural-Network Approach", IEEE, pp. 98-113 (Year: 1997).*

Wang, Zhongdao et al., Orientation Invariant Feature Embedding and Spatial Temporal Regularization for Vehicle Re-identification, . . . 2017 IEEE International Conference on Computer Vision, Copyright 2017 IEEE, pp. 379-387.

Timofte et al., "Seven ways to improve example-based single image super resolution", 2016 IEEE Conference on Computer Vision and Pattern Recognition (CVPR), 9 pages.

Donn et al., "Exploiting Reflectional and Rotational Invariance in Single Image Superresolution", 2017 IEEE Conference on Computer Vision and Pattern Recognition Workshops (CVPRW), 7 pages.

Wu et al., "Flip-Rotate Pooling Convolutional and Split Dropout on Convolution Neural Networks for Image Classification", Jul. 31, 2015, 9 pages.

Dieleman et al., "Rotation-Invariant Convolutional Neural Networks for Galaxy Morphology Prediction", Monthly Notices of the Royal Astronomical Society, Jun. 21, 2015, 19 pages.

Ren et al., "CT-SRCNN: Cascade Trained and Trimmed Deep Convolutional Neural Networks for Image Super Resolution", 2018 IEEE Winter Conference on Applications of Computer Vision (WACV), 11 pages.

Ding et al., "CIRCNN: Accelerating and Compressing Deep Neural Networks using Block-Circulant Weight Matrices", ACM, Aug. 29, 2017, 14 pages.

* cited by examiner

METHOD AND APPARATUS FOR PROVIDING ROTATIONAL INVARIANT NEURAL NETWORKS

PRIORITY

This application is based on and claims priority under 35 U.S.C. § 119(e) to a U.S. Provisional Patent Application filed on Mar. 5, 2019 in the United States Patent and Trademark Office and assigned Ser. No. 62/814,099, the entire contents of which are incorporated herein by reference.

FIELD

The present disclosure relates generally to neural networks. In particular, the present disclosure is related to a method and apparatus for providing a rotational invariant neural network.

BACKGROUND

Deep convolutional neural networks have evolved to be the state of the art in the field of machine learning, for example, object detection, image classification, scene segmentation, and image quality improvement such as super resolution, and disparity estimation.

There has been recent interest in developing specific hardware accelerators for training and running deep convolutional networks. Convolutional neural networks (CNNs) are composed of multiple layers of convolutional filters (also referred to as kernels). Due to the large number of feature maps at each layer, the large dimension of the filters (kernels), and the increasingly large number of layers in deep neural networks, such a process is computationally expensive. The complexity of computation increases with a larger input size (e.g., a full high dimension (HD) image), which translates into a larger width and height of input feature maps, and all intermediate feature maps. The convolutions are performed by repetitive use of an array of multiply accumulate (MAC) units. A typical MAC is a sequential circuit that computes the product of two received values, and accumulates the result in a register.

SUMMARY

According to one embodiment, a method includes receiving a first input of an image in a first orientation, and training a kernel to be symmetric such that an output corresponding to the first input is the same as an output corresponding to a second input of the image in a second orientation.

According to one embodiment, a system includes a memory and a processor configured to receive a first input of an image in a first orientation and train a kernel to be symmetric such that an output corresponding to the first input is the same as an output corresponding to a second input of the image in a second orientation.

According to one embodiment, a method includes receiving, by a neural network, a first input of an image in a first orientation, generating a first loss function based on a first output associated with the first input, receiving, by the neural network, a second input of the image in a second orientation, generating a second loss function based on a second output associated with the second input, and training the neural network to minimize a sum of the first loss function and the second loss function.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
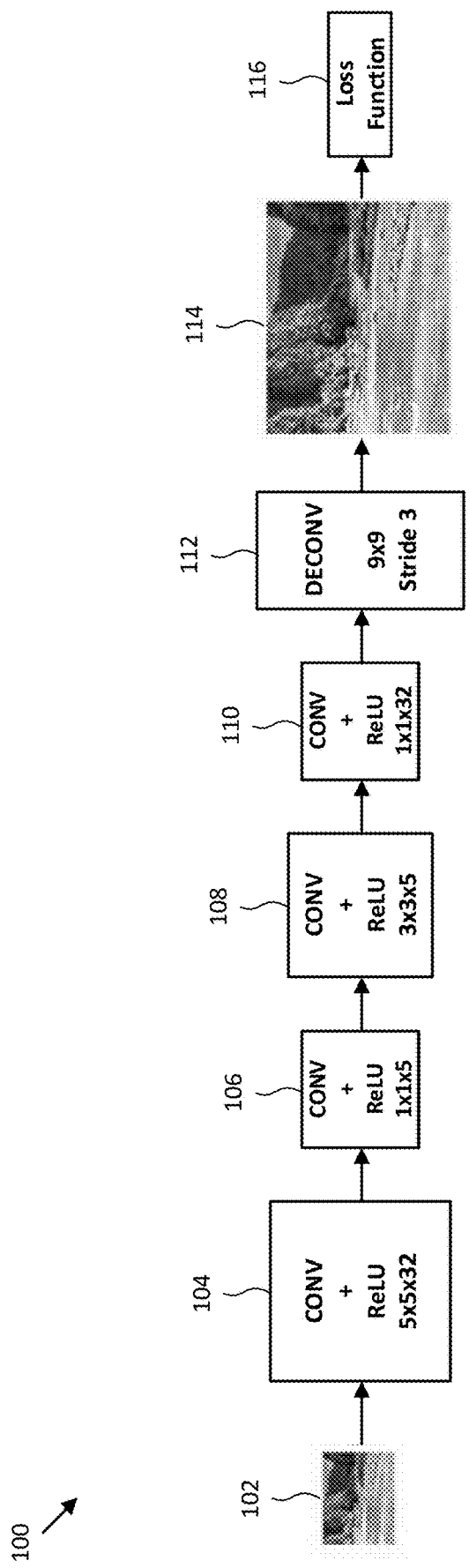
FIG. 1 is a diagram of a neural network, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present disclosure provides a system and method for training convolutional neural networks such that their output does not depend on the orientation of the input. This may be desirable in applications such as image enhancements where a similar image enhancement performance is achieved regardless of the input image orientation as landscape or portrait, or rotate upside down or left-right flip of the input image. Another application is the pattern recognition (e.g., the correct classification of an object in an image regardless the orientation of the input image or the orientation of the object in the image).

The present disclosure provides a system and method for designing and training neural networks to improve end results and make the network orientation invariant. In some applications, like image denoising or image super resolutions, different results can be observed if the network is applied on different left-right or up-down mirror flips of the input image. However, the orientation of the input image is not known in real applications. By designing the neural network to be symmetric end-to-end, it can be guaranteed that the end result is similarly good for all input orientations and the output is invariant to flips or transposes in the input.

The present disclosure provides a system and method for devising low complexity implementation for convolutions. There are methods for lower complexity implementations of convolutions. Such methods include point-wise multiplication in the Fast Fourier Transform (FFT) domain or the Winograd domain. By designing the neural network such that its kernels are symmetric, lower complexity algorithms to implement the convolutional operator in the FFT domain are provided.

In one embodiment, the present system includes neural network kernels such that the kernels are symmetric to the desired degrees of flips or transposes is disclosed. Hence, by enforcing each individual kernel to be symmetric, the end-to-end network is symmetric to the input as well.

The present disclosure provides a system and method for training a network such that an output of the network is invariant to different rotations in the input. In one embodiment, the present system and method provides training an end-to-end symmetric neural network but the constituent filters need not be symmetric. In another embodiment, the present systems and methods provide training a deep neural network whose constituent filters are symmetric and their response is invariant to the input rotations, and thus if enforced across all filters in the network, the resulting network is also end-to-end symmetric.

FIG. 1 is a diagram 100 of a neural network, according to an embodiment. An input 102 is sent to the neural network 100 which includes five layers. The first layer 104 is a convolutional layer with a rectified linear unit (ReLU) activation function and a 5×5×32 kernel. The second layer 106 is a convolutional layer with a ReLU activation function and a 1×1×5 kernel. The third layer 108 is a convolutional layer with a ReLU activation function and a 3×3×5 kernel. The fourth layer 110 is a convolutional layer with a ReLU activation function and a 1×1×32 kernel. The fifth layer 112 is a de-convolutional layer with a 9×9 kernel having a stride of 3. The weights of the first layer 104 are shared with the weights of the fifth layer 112. The network produces an output 114, from which a loss function 116 is generated.

Figure 2:
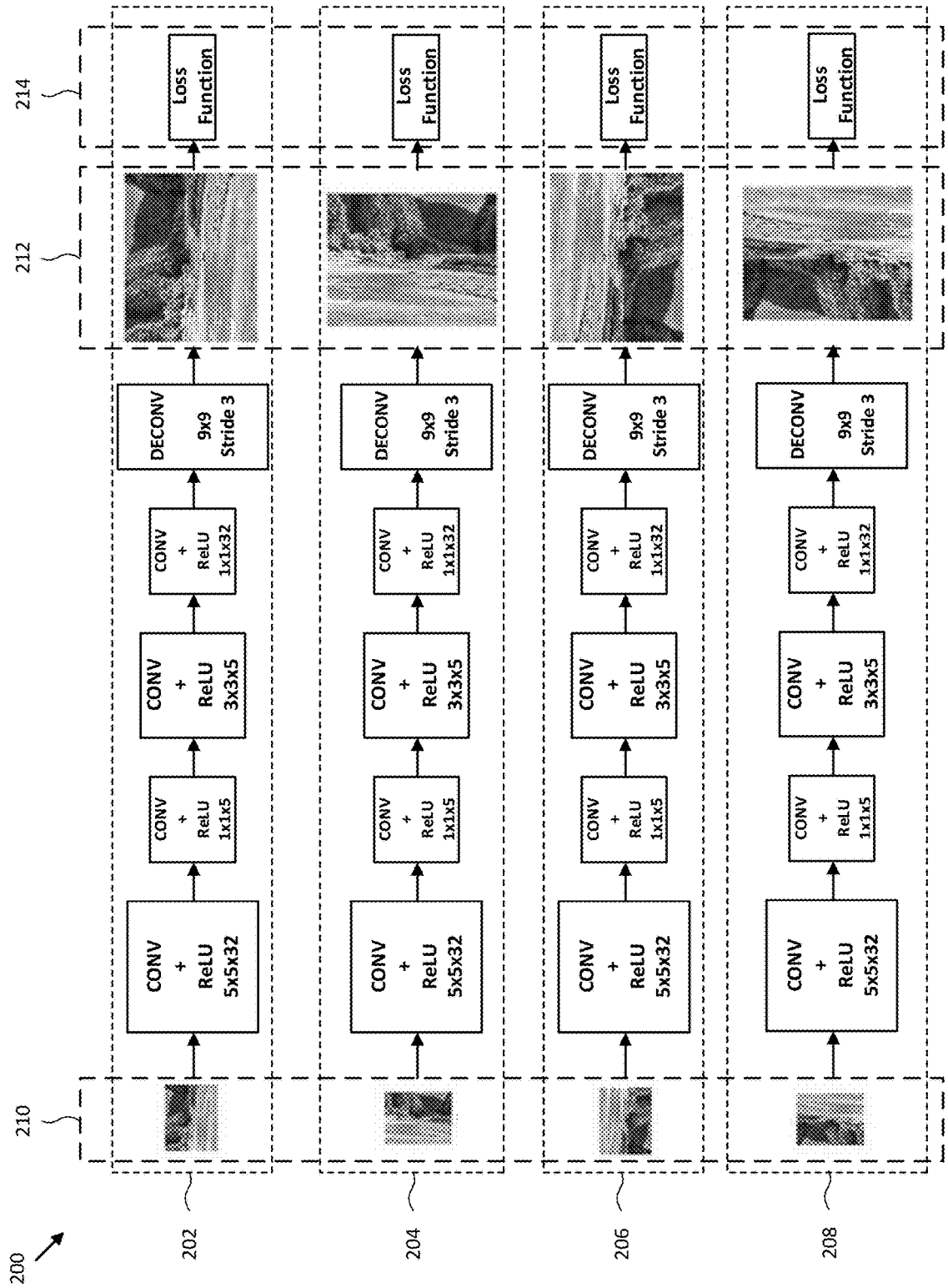
FIG. 2 is a diagram of a method to train a symmetric neural network, according to an embodiment.

FIG. 2 is a diagram 200 of a method to train a symmetric neural network, according to an embodiment. A first training iteration 202 is shown using a neural network such as that depicted in FIG. 1, and subsequent training iterations 204, 206 and 208 are shown using copies of the neural network of the first training iteration 202. In each training iteration 202-208, the image 210 is input with a different orientation. The input is processed through various layers of the network, an output 212 is generated, and a loss function 214 is calculated, which may be minimized. A loss function 214 is generated for each output 212, and each loss function 214 corresponds to an orientation of the image 210.

The system forces the network as a whole to learn a symmetric transformation. For example, consider that the network only learns that the output is invariant to left-right mirror flips. The system may feed the image patch to a first network and a left-right flip version of the image to another copy (by weight sharing) of the network. The system may modify the loss function to have an extra term corresponding to the added loss from the flipped image (e.g., using mean square error (MSE)) enforcing that the network output of normal images, and the reverse flip of the output of the copy network, to indicate to the network and let the network learn that both outputs should be the same or similar. This may be extended to 9 networks to learn all flips. However, in inference, only one network (e.g., a single network) is used. Such a network has more degrees of freedom than the layer-by-layer symmetric network so it may have better performance.

The system may be applied to super resolution. The system obtains convolutional neural networks such that their output does not depend on the orientation of the input. Instead of only training the convolutional neural network using the original data, the system may augment the data with different orientations. The system may train a unified network using the augmented dataset, but the loss function is computed for the data with different orientations respectively. These loss functions are minimized at the same time, while assigning equal weights. This is similar to training multiple convolutional neural networks using the data with different orientations, while these networks share exact the same architecture and weights.

The method may be applied in addition to a cascade trained-super resolution convolutional neural network (CT-SRCNN)-5 layer as described in U.S. patent application Ser. Nos. 15/655,557 and 16/138,279, both entitled "System and Method for Designing Efficient Super Resolution Deep Convolutional Neural Networks by Cascade Network Training, Cascade Network Trimming, and Dilated Convolutions, which are incorporated herein by reference.

A major difference of the present system compared to a typical method is that the convolutional neural network is only applied once in the testing procedure. Since the loss function of each orientation is given equal weight for all training samples, the network will implicitly learn an approximate orientation invariant.

As shown in Table 1, the above CT-SRCNN-5 network of FIG. 1 may be tested using the images from Set 14 with different orientations.

TABLE 1

| Input | Set14PSNR | Set14SSIM |
| --- | --- | --- |
| Original | 29.23 | 0.8193 |
| Flip top-down | 29.23 | 0.8190 |
| Flip left-right | 29.23 | 0.8191 |
| Flip top-down + left-right | 29.22 | 0.8192 |
| Average | 29.23 | 0.8192 |

It is observed that the peak signal to noise ratio (PSNR) and structural similarity index (SSIM) are almost the same with different orientations. Therefore, it may be confirmed that the data augmentation architecture in FIG. 1 can result in an approximate orientation invariant.

Figure 3:
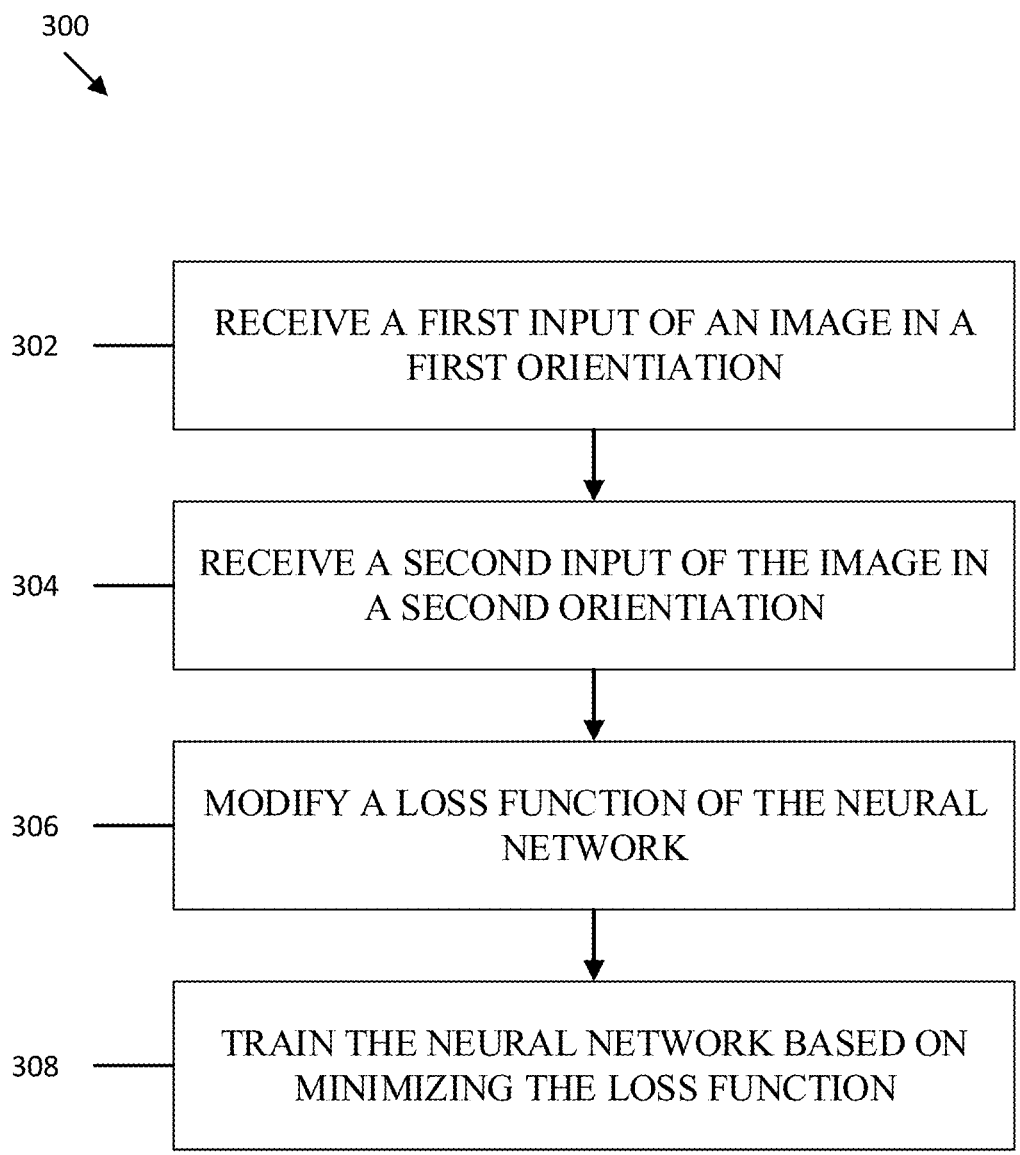
FIG. 3 is a flowchart of a method for training an end-to-end symmetric neural network where kernels are not symmetric, according to an embodiment.

FIG. 3 is a flowchart 300 of a method for training an end-to-end symmetric neural network where kernels are not symmetric, according to an embodiment. At 302, the system receives a first input of an image in a first orientation. The first input may be received by a neural network. An image can have various orientations, such as an original orientation, a flipped left-to-right (flipLR) orientation, a flipped up-to-down (flipUD) orientation, etc, such as the orientations of inputs 202-208 of FIG. 2.

At 304, the system receives a second input of the image in a second orientation. For example, if the system receives the image in the orientation shown at 202, the second orientation may be the orientation shown in 204, 206 or 208.

The second input may be received by a copy of the neural network that received the first input.

At 306, the system modifies a loss function of the neural network. The loss function is modified to include an extra term enforcing network outputs of the first input and the second input such that the network learns that both the first output and the second output should be the same or similar.

At 308, the system trains the neural network based on minimizing the loss function modified at 306. Thus, the system learns a symmetric convolutional neural network, where each of the individual kernels in the filters of the convolutional neural network are made symmetric. An advantage is that this can ensure the output to be exactly the same for different rotations, and the resulting network is very efficient. Less memory space is required to save the network weights, and the computational cost can also be reduced (e.g., real FFT).

Figure 4:
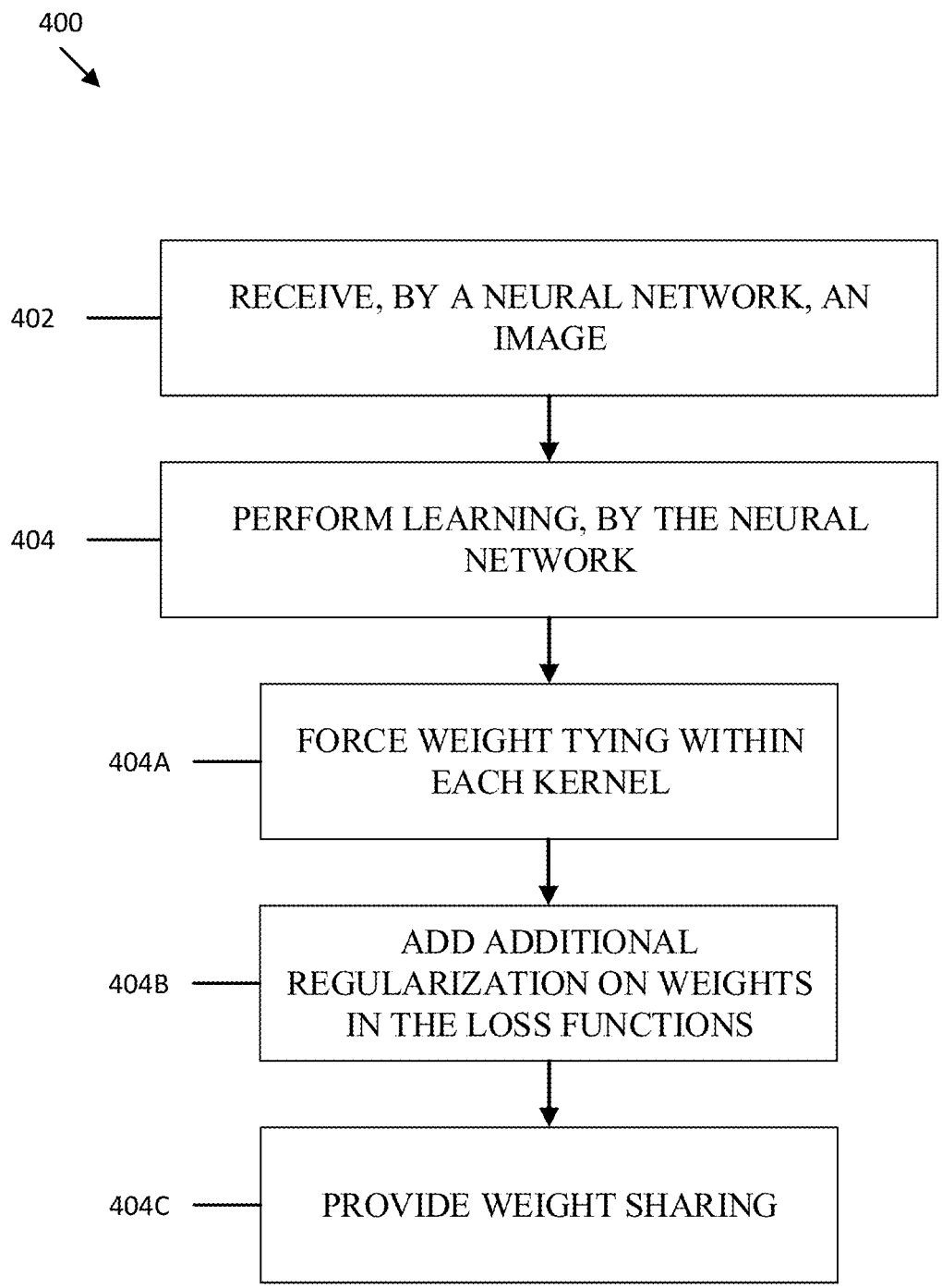
FIG. 4 is a flowchart of a method for training an end-to-end neural network where kernels are symmetric, according to an embodiment.

FIG. 4 is a flowchart of a method for training an end-to-end neural network where kernels are symmetric, according to an embodiment. At 402, the system receives, by a neural network, an image. The image may be in various orientations.

Consider a linear interpolation convolution filter, for ×4 upsampling, the filter is sampled at 4 intervals in +ve and −ve directions, giving the following symmetric filter coefficients as in Equation (1):

$$conv(xx,y)=\text{flip}LR(conv(xx,\text{flip}LR(y))) \quad (1)$$

At 404, the system performs learning, by the neural network. A neural network may be trained to have a symmetric output and save the 8 computations in inference in several ways. First, CT-SRCNN like architectures which are fully convolutional may be utilized, wherein the input is upsampled to a desired resolution by a symmetric conventional interpolation filter (e.g., bicubic interpolation) before the first layer. Using a greedy approach, if a result after each layer is invariant to flipping in any direction, then the whole network result will be invariant to flipping. A sufficient condition is that the two dimension (2d) plane of all kernels are symmetric. For example, consider following 2d 3×3 kernel as in Equation (2).

$$\begin{bmatrix} w1 & w2 & w1 \\ w3 & w0 & w3 \\ w1 & w2 & w1 \end{bmatrix} \quad (2)$$

The 9 parameters are limited to have 4 degrees of freedom, rather than 9, making the kernel symmetric in both x and y directions. Non-linear operations after symmetric kernels may be utilized since they are applied element-wise.

Second, fast per resolution CNN (FSRCNN) architectures with low resolution (LR) input and high resolution (HR) output upsample feature maps with deconvolutions at last layer may be utilized. A sufficient condition for symmetry is that the deconvolution filter should be symmetric and the input should be upsampled by appropriate zero insertion. Hence, it is sufficient that all 2d planes of the convolutional kernels and the deconvolution kernel are symmetric for the whole network to be symmetric.

Third, efficient sub-pixel CNN (ESPCNN) architectures may be utilized. A sufficient condition is that all filters before last sub-pixel arrangement layer are symmetric. The individual filters of sub-pixel re-arrangement layer are not symmetric, however they are a polyphase implementation of a symmetric filter and are sampled from the same symmetric deconvolutional filter described above for FSRCNN.

To train the network to have symmetric filters in 2d plane (3D kernels are a bunch of 2d filters), the system may adjust a filter implementation by using weight tying or weight sharing. For all filter coefficients belonging to same value, for example, at all w1 locations above, the system may initialize them with a similar value, and update them with the average gradients of filter coefficients, averaged over all gradients of weights at w1 locations, thereby forcing them to be the same after each update step, layer by layer. This should be also equivalent as averaging the filter coefficients at all locations of w1 after each update step.

The condition for symmetric filters at each filter is sufficient but not necessary. For example, the convolution of a non-symmetric filter with its flip results in a symmetric filter is shown as Equation (3).

$$conv([1\ 2],[2\ 1])=[2\ 5\ 2] \tag{3}$$

This indicates that the network may be trained end-to-end such that its end-to-end transfer function is symmetric (i.e., the network function is invariant to flips).

Several examples for training neural networks such that each kernel is symmetric are disclosed below with reference to W as shown in Equation (4).

$$W = \begin{bmatrix} w1 & w2 & w3 \\ w4 & w5 & w6 \\ w7 & w8 & w9 \end{bmatrix} \tag{4}$$

At 404A, the system learns by forcing weight tying within each kernel. The system may force weight tying by averaging the gradients of coordinates belonging to same value. This training method may be evaluated for symmetric kernels on image super resolution with the present CT-SRCNN models. Referring to Table 2, the PSNR and SSIM results for Set14 image dataset with and without symmetric kernel constraints are summarized.

TABLE 2

| Model | Kernels | Set14PSNR (dB) | Set14SSIM |
|---|---|---|---|
| Bicubic | Symmetric | 27.54 | 0.7733 |
| CT-SRCNN5 | — | 29.57 | 0.8259 |
|  | Symmetric | 29.57 | 0.8255 |
| CT-SRCNN9 | — | 29.79 | 0.8299 |
|  | Symmetric | 29.70 | 0.8273 |

It is observed that the loss due to symmetric kernel constraints is marginal.

At 404B, the system adds additional regularization on weights in the loss functions. The system may add regularization terms to enforce conditions for each kernel so that the kernel is symmetric. It is noted that this may be too prohibitive for deep networks. For one kernel, the system sums regularization on these constraints to provide the following symmetric filter as in Equations (5) and (6).

$$w3=w1=w7=w9; w2=w8; w4=w6 \tag{5}$$

$$w3 = w1 = w7 = w9;\ w2 = w8;\ w4 = w6 \tag{5}$$

$$W = \begin{bmatrix} w1 & w2 & w1 \\ w4 & w5 & w4 \\ w1 & w2 & w1 \end{bmatrix} \tag{6}$$

At 404C, the system performs learning by providing weight sharing. A 2d symmetric filter may be expressed as a sum of 4 filters as in Equation (7):

$$W + \text{flip}LR(W) + \text{flip}UD(W) + \text{flip}UD(\text{flip}LR(W)) \tag{7}$$

where, as in Equation (8):

$$W = \begin{bmatrix} w1 & w2 & w3 \\ w4 & w5 & w6 \\ w7 & w8 & w9 \end{bmatrix}; Y = \begin{bmatrix} w3 & w2 & w1 \\ w6 & w5 & w4 \\ w9 & w8 & w7 \end{bmatrix}; \tag{8}$$

$$Z = \text{flip}UD(W) = \begin{bmatrix} w7 & w8 & w9 \\ w4 & w5 & w6 \\ w1 & w2 & w3 \end{bmatrix};$$

$$V = \text{flip}UD(\text{flip}LR(W)) = \begin{bmatrix} w9 & w8 & w7 \\ w6 & w5 & w4 \\ w3 & w2 & w1 \end{bmatrix}$$

The sum is as Equation (9).

$$W + Y + Z + V = \tag{9}$$
$$\begin{bmatrix} w1+w3+w7+w9 & 2*w2+2*w8 & w1+w3+w7+w9 \\ 2*w4+2*w6 & 4*w5 & 2*w4+2*w6 \\ w1+w3+w7+w9 & 2*w2+2*w8 & w1+w3+w7+w9 \end{bmatrix}$$

Each convolutional layer W is replaced by W+Y+Z+V. Training is done by weight sharing across the 4 filters as determined by the locations in the filter which have the same weight value.

Alternatively, if weight sharing with permutations cannot be used, the system may force it by finding the average gradient matrix G of the gradient matrices of the rotated filters. Each of the rotated weight matrices are then updated using the corresponding rotations of the average gradient matrix G, as in Equation (10).

$$W=W+G; Y=Y+\text{flip}LR(G); Z=Z+\text{flip}UD(G); V=V+\text{flip}UD(\text{flip}LR(G)) \tag{10}$$

Each layer is then invariant to the rotations, as its output is the sum of the responses from the different rotated filters (i.e., the response due to W+Y+Z+V, which is a symmetric filter). A symmetric 2 dim matrix V4 can be obtained from a random matrix, as in Equations (11), (12), (13) and (14).

$$V = rand(3) \tag{11}$$

$$V4 = V + flipLR(V) + flipUD(V) + flipLR(flipUD(V)) \tag{12}$$

$$V = \begin{bmatrix} 0.24071 & 0.67181 & 0.25479 \\ 0.67612 & 0.69514 & 0.22404 \\ 0.28906 & 0.06799 & 0.66783 \end{bmatrix} \tag{13}$$

$$V4 = \begin{bmatrix} 1.4524 & 1.4796 & 1.4524 \\ 1.8003 & 2.7806 & 1.8003 \\ 1.4524 & 1.4796 & 1.4524 \end{bmatrix} \tag{14}$$

If the filter output needs to be symmetric in the transpose directions as well, the system may add 4 more constraints, or equivalently the filter can be expressed as a sum of 8 filters as in Equations (15) and (16).

$$V5 = V + flipLR(V) + flipUD(V) + flipLR(flipUD(V)) + \\ V' + flipLR(V') + flipUD(V') + flipLR(flipUD(V')) \quad (15)$$

$$V5 = \begin{bmatrix} 2.9048 & 3.2799 & 2.9048 \\ 3.2799 & 5.5611 & 3.2799 \\ 2.9048 & 3.2799 & 2.9048 \end{bmatrix} \quad (16)$$

In one embodiment, the system may utilize symmetric convolutions to decrease the implementation complexity of neural networks. One advantage of a symmetric filter is that its FFT is real. The system may use a theorem that states that Fourier transform of a real even function is real and even, as in Equation (17).

$$DTFT(x) = \sum_{n=-\infty}^{n=\infty} x(n)e^{-j\omega n} \quad (17)$$
$$= \sum_{n=-\infty}^{n=\infty} x(n)(\cos(\omega n) + j\sin(\omega n))$$
$$= \sum_{n=-\infty}^{n=\infty} x(n)\cos(\omega n)$$

Since x(n) and cos (ωn) are both real and even, their product is real and even and their sum over the samples is also real and even, where as x(n) and sin (ωn) is odd and its sum over the samples is zero.

In 1 dimension (1D), 1D symmetry guarantees its FFT coefficients are real. To have real FFT coefficients in 2D, at least V4 type of symmetry (e.g., symmetry in all LR, UD, LR (UD)) is needed (e.g., neglecting imaginary coefficients smaller than 1 e-14 due to numerical issues).

Using the above examples for V and V4, the FFT of V is complex as shown in Equation (18).

$$FV = \begin{bmatrix} -0.071922 - 0.075718i & -0.78016 + 0.2446i & -0.51285 + 0.35819i \\ 0.86202 - 0.57566i & 3.9081 & 0.86202 + 0.57566i \\ -0.51285 + 0.35819i & -0.78016 - 0.2446i & -0.071922 - 0.075718i \end{bmatrix} \quad (18)$$

The FFT of V4 is real as shown in Equation (19).

$$FV4 = \begin{bmatrix} -1.1695 & -3.1207 & -1.1695 \\ 3.4481 & 15.632 & 3.4481 \\ -1.1695 & -3.1207 & -1.1695 \end{bmatrix} \quad (19)$$

An FFT of a real signal has Hermitian symmetry, which reduces the number of computations. It is observed that the FFT of V4 is also 2D symmetric. Since the values are also real, missing values are the same without a need to perform a complex conjugate operation.

The FFT of V5 is real and doubly symmetric like V5 as shown in Equation (20).

$$FV5 = \begin{bmatrix} -2.3391 & 0.32741 & -2.3391 \\ 0.32741 & 31.265 & 0.32741 \\ -2.3391 & 0.32741 & -2.3391 \end{bmatrix} \quad (20)$$

The FFT of V5 is real and also symmetric. For a 3×3 kernel, only 4 real FFT computations are needed for 2D symmetry, and only 3 real FFT computations are needed for 2D symmetry with 2D transpose symmetry. However, the computation gain from computing a 2D FFT if V is doubly symmetric increases with kernel size. For a kernel N×N with double 2D symmetry, the number of different parameters in the spatial domain (or FFT computations for the FFT domain per kernel is shown in Equation (21).

$$\sum_{i=1}^{\frac{N+1}{2}} i = \frac{1}{8}(N+1)(N+3) \quad (21)$$

With single 2D symmetry, the number of different parameters (or FFT computations needed) is shown in Equation (22).

$$\tfrac{1}{4}(1+N)^2 \quad (22)$$

Convolutions can be implemented in the Fourier domain A as in Equation (23).

$$conv\ B = 1FFT(FFT(A) \odot FFT(B)) \quad (23)$$

Hence, the complexity can be further reduced by enforcing the kernels to be symmetric, so only the real coefficients of the FFT need to be calculated, and only at specific locations due to the 2D symmetry of the FFT. By reducing implementation complexity of each convolutional layer, the complexity of implementation of deep convolutional neural networks may be reduced proportionally.

In one embodiment, the system may further reduce FFT computational complexity by constraining the circulant matrices to be symmetric. Such a block may be referred to as a block-circulant and symmetric matrix. The weight matrix of a fully-connected layer is constrained to be a block-circulant matrix so that the matrix multiplication can be performed in low complexity by FFT-based fast multiplication.

Figure 5:
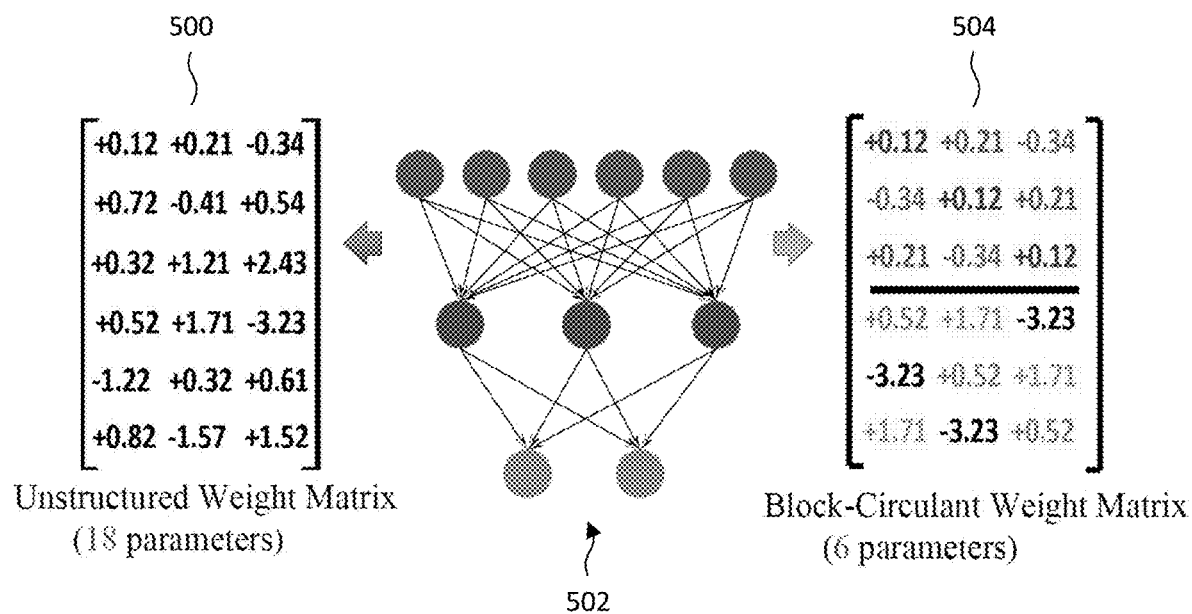
FIG. 5 is a diagram of block-circulant matrices, according to an embodiment.

FIG. 5 is a diagram of block-circulant matrices, according to an embodiment. The block-circulant matrix 500 is an unstructured weight matrix that includes 18 parameters. After processing through the reduction ratio 502, the block-circulant matrix 504 is constrained and includes only 6 parameters, thereby reducing computation complexity.

When calculating WX where W is the weight matrix of size N×M and X is the input feature map of size M×1, suppose that W includes small circulant matrices $W_{ij}$ of size n×n for 1≤i≤l=N/n and 1≤j≤k=M/n. It is assumed that N and M are integer multiples of n for simplicity, which can be made given any weight matrix by zero padding if needed. X may be split similarly and it is easy to show, as in Equation (24):

$$WX = \begin{bmatrix} \sum_{j=1}^{k} W_{1j} X_j \\ \sum_{j=1}^{k} W_{2j} X_j \\ \vdots \\ \sum_{j=1}^{k} W_{lj} X_j \end{bmatrix}, \quad (24)$$

$$W = \begin{bmatrix} W_{11} & W_{12} & \ldots & W_{1k} \\ W_{21} & W_{22} & \ldots & W_{2k} \\ \vdots & \vdots & \ddots & \vdots \\ W_{l1} & W_{l2} & \ldots & W_{lk} \end{bmatrix},$$

$$X = \begin{bmatrix} X_1 \\ X_2 \\ \vdots \\ X_l \end{bmatrix}.$$

Each $W_{ij}$ is a circulant matrix and then $W_{ij}X_i$ can be computed using FFT and inverse FFT (IFFT) as in Equation (25):

$$W_{ij}X_i = IFFT(FFT(w_{ij}) \odot FFT(X_1)), \quad (25)$$

where $w_{ij}$ is the first column vector of matrix $W_{ij}$ and $\odot$ denotes element-wise product.

Given a vector $x=[x_1, x_2 \ldots, x_N]$ of length N. If $x_{N-i}=x_i$ for all $1 \le i \le N$ then $X_{N-i}=X_i^*$ for all $1 \le i \le N$, where $X=[X_1, X_2, \ldots X_N]$ is the FFT output of x. That is, the system only needs to compute the first half of the FFT and take the conjugate to get the other half. Furthermore as shown above, since x represents the filter weights and is real, then the DTFT is both real and symmetric. Thus, the complex coefficients need not be computed. If each circulant matrix $W_{ij}$ is constrained to be symmetric (i.e., make $w_{ij}$ symmetric), then the computational complexity of FFT may be reduced.

Figure 6:
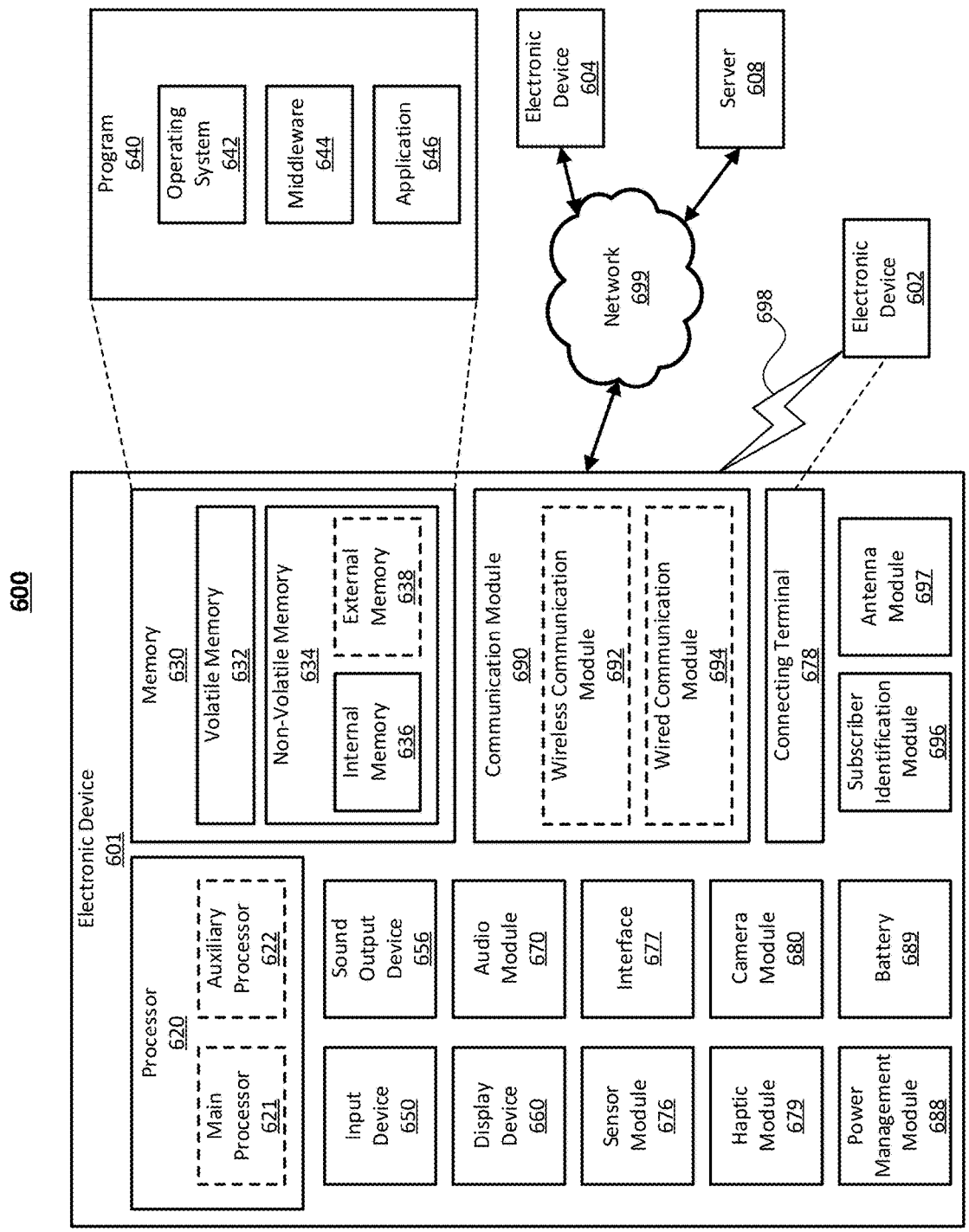
FIG. 6 is a block diagram of an electronic device in a network environment, according to one embodiment.

FIG. 6 is a block diagram of an electronic device 601 in a network environment 600, according to one embodiment. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wiredly) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
receiving a first input of an image in a first orientation; and
training a kernel to be symmetric, thereby causing an output corresponding to the first input to be identical to an output corresponding to a second input of the image in a second orientation, and
training a convolutional neural network to be symmetric by training multiple kernels at different layers to be symmetric,
wherein the second orientation is a flipped version of the image with respect to the first orientation of the image.

2. The method of claim 1, wherein training the kernel to be symmetric further comprises forcing weight tying within the kernel.

3. The method of claim 2, wherein forcing weight tying further comprises averaging gradients of coordinates belonging to same values.

4. The method of claim 1, wherein training the kernel to be symmetric further comprises adding regularization on weights in a loss function associated with outputs.

5. The method of claim 1, wherein training the kernel to be symmetric further comprises providing weight sharing across multiple filters.

6. The method of claim 5, wherein weight sharing across multiple filters further comprises expressing the kernel as a sum of the multiple filters.

7. The method of claim 5, wherein weights are shared across the multiple filters based on an average gradient matrix of gradient matrices of the multiple filters.

8. The method of claim 1, further comprising applying the trained symmetric kernel to a block-circulant weight matrix.

9. A system, comprising:
a memory; and
a processor configured to:
receive a first input of an image in a first orientation; and
train a kernel to be symmetric, thereby causing an output corresponding to the first input to be identical to an output corresponding to a second input of the image in a second orientation, and
train a convolutional neural network to be symmetric by training multiple kernels at different layers to be symmetric,
wherein the second orientation is a flipped version of the image with respect to the first orientation of the image.

10. The system of claim 9, wherein the processor is further configured to train the kernel to be symmetric by forcing weight tying within the kernel.

11. The system of claim 10, wherein forcing weight tying further comprises averaging gradients of coordinates belonging to same values.

12. The system of claim 9, wherein the processor is further configured to train the kernel to be symmetric by adding regularization on weights in a loss function associated with outputs.

13. The system of claim 9, wherein the processor is further configured to train the kernel to be symmetric by providing weight sharing across multiple filters.

14. The system of claim 13, wherein weight sharing across multiple filters further comprises expressing the kernel as a sum of the multiple filters.

15. The system of claim 13, wherein weights are shared across the multiple filters based on an average gradient matrix of gradient matrices of the multiple filters.

16. The system of claim 9, wherein the processor is further configured to apply trained symmetric kernel to a block-circulant weight matrix.

17. A method, comprising:
receiving, by a neural network, a first input of an image in a first orientation;
generating a first loss function based on a first output associated with the first input;
receiving, by the neural network, a second input of the image in a second orientation;
generating a second loss function based on a second output associated with the second input;
training the neural network to minimize a sum of the first loss function and the second loss function; and training a convolutional neural network to be symmetric by training multiple kernels at different layers to be symmetric, wherein the second orientation is a flipped version of the image with respect to the first orientation of the image.

18. The method of claim 17, further comprising modifying the second loss function to have an extra term corresponding to added loss from the second image.

* * * * *